(12) United States Patent
Park

(10) Patent No.: US 11,828,947 B2
(45) Date of Patent: Nov. 28, 2023

(54) VEHICLE AND CONTROL METHOD THEREOF

(71) Applicants: HYUNDAI MOTOR COMPANY, Seoul (KR); KIA CORPORATION, Seoul (KR)

(72) Inventor: Jong Hwa Park, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/861,549

(22) Filed: Jul. 11, 2022

(65) Prior Publication Data

US 2023/0069348 A1 Mar. 2, 2023

(30) Foreign Application Priority Data

Sep. 2, 2021 (KR) .................. 10-2021-0116653

(51) Int. Cl.
| | |
|---|---|
| B60R 1/00 | (2022.01) |
| B60K 35/00 | (2006.01) |
| G02B 27/01 | (2006.01) |
| G06F 3/01 | (2006.01) |
| G06F 3/147 | (2006.01) |
| B60W 60/00 | (2020.01) |

(52) U.S. Cl.
CPC .......... *G02B 27/0179* (2013.01); *B60K 35/00* (2013.01); *G02B 27/0101* (2013.01); *G06F 3/013* (2013.01); *G06F 3/147* (2013.01); *B60K 2370/1529* (2019.05); *B60K 2370/167* (2019.05); *B60K 2370/175* (2019.05); *B60K 2370/21* (2019.05); *B60K 2370/28* (2019.05); *B60K 2370/349* (2019.05); *B60K 2370/67* (2019.05); *B60K 2370/741* (2019.05); *B60W 60/005* (2020.02); *G02B 2027/0138* (2013.01); *G02B 2027/0141* (2013.01); *G02B 2027/0181* (2013.01)

(58) Field of Classification Search
CPC ....................................................... B60K 35/00
See application file for complete search history.

(56) References Cited

U.S. PATENT DOCUMENTS

| | | | |
|---|---|---|---|
| 10,688,915 B1* | 6/2020 | Rastoll | B60Q 1/50 |
| 2017/0349098 A1* | 12/2017 | Uhm | G08G 1/0967 |
| 2019/0138092 A1* | 5/2019 | Song | G06T 7/20 |
| 2020/0039506 A1* | 2/2020 | Woodbury | B60W 30/06 |
| 2020/0238826 A1* | 7/2020 | Mizobata | G06F 3/1446 |
| 2022/0118982 A1* | 4/2022 | Ito | B60W 50/14 |

* cited by examiner

*Primary Examiner* — Nan-Ying Yang
(74) *Attorney, Agent, or Firm* — Morgan, Lewis & Bockius LLP

(57) ABSTRACT

A vehicle includes a transparent display provided on the dashboard to face the front of the driver and provided to be able to descend inside the dashboard or ascend above the dashboard, an input device provided to obtain a user input, and a controller configured to adjust an ascending height of the transparent display and to adjust transparency of the transparent display, according to a driving mode selected by the user input.

18 Claims, 15 Drawing Sheets

VEHICLE AND CONTROL METHOD THEREOF

CROSS-REFERENCE TO RELATED APPLICATION(S)

The present application claims priority to Korean Patent Application No. 10-2021-0116653, filed on Sep. 2, 2021, the entire contents of which is incorporated herein for all purposes by this reference.

BACKGROUND OF THE PRESENT DISCLOSURE

Field of the Present Disclosure

The present disclosure relates to a vehicle including a transparent display and a control method thereof.

Description of Related Art

As a type of a transparent display provided in a vehicle, there is a head-up display (HUD). A conventional head-up display projects light on a transparent screen, such as a windshield of a vehicle and a separate transparent glass, to form an image. Because the conventional head-up display utilizes a method of projecting light, when an external environment is bright, an image formed on the screen may not be visible well, and a shake of the head-up display may occur due to unevenness of a road. Furthermore, an image formed on the screen may not be visible depending on an eye level of a driver. Due to the provided configuration, fatigue of eyes of the driver looking at the head-up display may increase, and the driver may feel uncomfortable.

Recently, a digital side mirror including a camera has been developed and applied to a vehicle. The digital side mirror may include a camera provided on an external surface of a door of the vehicle and a display provided inside the vehicle. The camera photographs a rear lateral of the vehicle, and a rear lateral image captured by the camera is output through the display. The digital side mirror receives power from a battery of the vehicle and continuously consumes power while the vehicle is operating. However, when the digital side mirror always operates at the highest performance, power consumption may increase and a charge amount of the battery may decrease relatively rapidly.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a vehicle configured for disposing a transparent display including a transparent LCD panel or a transparent OLED panel on a dashboard, and adjusting a height and transparency of the transparent display, and a control method thereof.

Furthermore, it is an aspect of the present disclosure to provide a vehicle configured for reducing power consumption by controlling an operation of a side display forming a digital side mirror, and a control method thereof.

Additional aspects of the present disclosure will be set forth in part in the description which follows, and in part, will be obvious from the description, or may be learned by practice of the present disclosure.

In accordance with an aspect of the present disclosure, a vehicle includes a transparent display provided on the dashboard to face the front of the driver and provided to descend inside the dashboard or ascend above the dashboard, an input device configured to obtain a user input, and a controller configured to adjust an ascending height of the transparent display and to adjust transparency of the transparent display, according to a driving mode selected by the user input, wherein the driving mode includes a manual driving mode and an autonomous driving mode.

The controller may be configured to adjust the ascending height of the transparent display to a predetermined first height based on a manual driving mode is selected or adjust the ascending height of the transparent display to a second height higher than the first height based on an autonomous driving mode is selected.

The controller may be configured to adjust the transparency of the transparent display to a predetermined first transparent value based on a manual driving mode is selected or adjust the transparency of the transparent display to a second transparent value lower than the first transparent value based on an autonomous driving mode is selected.

The controller may be configured to determine driving information to be displayed on the transparent display according to the driving mode and adjust at least one of a number of graphic element, size of the graphic element, position of the graphic element, or shape of the graphic element related to the driving information.

The controller may be configured to divide a screen area of the transparent display into a first region in which the driving information is displayed and a second region in which multimedia information by execution of a multimedia application is displayed, based on the execution of the multimedia application in the autonomous driving mode, and to control the transparent display to display a first graphic element related to the driving information in the first region and display a second graphic element related to the multimedia information in the second region.

The controller may be configured to control the transparent display to hide the driving information in accordance with execution of a multimedia application in the autonomous driving mode and control the transparent display to provide the driving information in a pop-up form in response to a situation in which a display of the driving information is required.

The vehicle may further include a camera provided to photograph a front of the vehicle and obtain front image data, wherein the controller may be configured to identify a road, a lane and other vehicle from the front image data, and to control the transparent display so that the graphic elements related to the driving information are displayed at positions corresponding to the road, the lane, and the other vehicle.

The vehicle may further include a driver sensor provided inside the vehicle to obtain a driver image, wherein the controller may be configured to identify a pupil of the driver based on the driver image, identify a vanishing point of the road from the front image data, and control the transparent display so that the graphic elements are displayed on a line connecting the vanishing point of the road and the pupil of the driver.

The vehicle may further include a side camera provided to obtain a rear lateral image of the vehicle, and a side display provided to output the rear lateral image, wherein the controller may be configured to identify a gaze direction of the driver based on the driver image and adjust brightness of the transparent display and brightness of the side display based on the gaze direction of the driver.

The transparent display may include a transparent liquid crystal display (LCD) panel or a transparent organic light emitting diode (OLED) panel.

The vehicle may further include a lifting device provided below the dashboard to ascend or descend the transparent display.

In accordance with an aspect of the present disclosure, a method for controlling a vehicle includes receiving a selection of a driving mode through an input device, adjusting an ascending height of a transparent display provided to descend inside a dashboard or ascend above the dashboard based on selection of the driving mode, adjusting transparency of the transparent display based on selection of the driving mode, and displaying driving information determined based on selection of the driving mode on the transparent display.

The adjusting of the ascending height of the transparent display may include adjusting the ascending height of the transparent display to a predetermined first height based on a manual driving mode is selected, or adjusting the ascending height of the transparent display to a second height higher than the first height based on an autonomous driving mode is selected.

The adjusting of the transparency of the transparent display may include adjusting the transparency of the transparent display to a predetermined first transparent value based on a manual driving mode is selected, and adjusting the transparency of the transparent display to a second transparent value lower than the first transparent value based on an autonomous driving mode is selected.

The displaying of the driving information may include adjusting at least one of a number of graphic element, size of the graphic element, position of the graphic element, or shape of the graphic element related to the driving information based on the selection of the driving mode.

The displaying of the driving information may include dividing a screen area of the transparent display into a first region in which the driving information is displayed and a second region in which multimedia information by execution of a multimedia application is displayed, based on the execution of the multimedia application in the autonomous driving mode, and displaying a first graphic element related to the driving information in the first region and display a second graphic element related to the multimedia information in the second region.

The displaying of the driving information may include hiding the driving information in accordance with execution of a multimedia application in the autonomous driving mode and providing the driving information in a pop-up form in response to a situation in which a display of the driving information is required.

The control method may further include photographing the front of the vehicle and obtaining front image data, and identifying a road, a lane and other vehicle from the front image data, wherein the displaying of the driving information may include displaying the graphic elements related to the driving information at positions corresponding to the road, the lane, and the other vehicle.

The control method may further include obtaining a driver image, identifying a pupil of a driver based on the driver image, and identifying a vanishing point of the road from the front image data, wherein the displaying of the driving information may include displaying the graphic elements on a line connecting the vanishing point of the road and the pupil of the driver.

The control method may further include identifying a gaze direction of the driver based on the driver image, and adjusting brightness of the transparent display, and brightness of a side display outputting a rear lateral image of the vehicle, based on the gaze direction of the driver.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
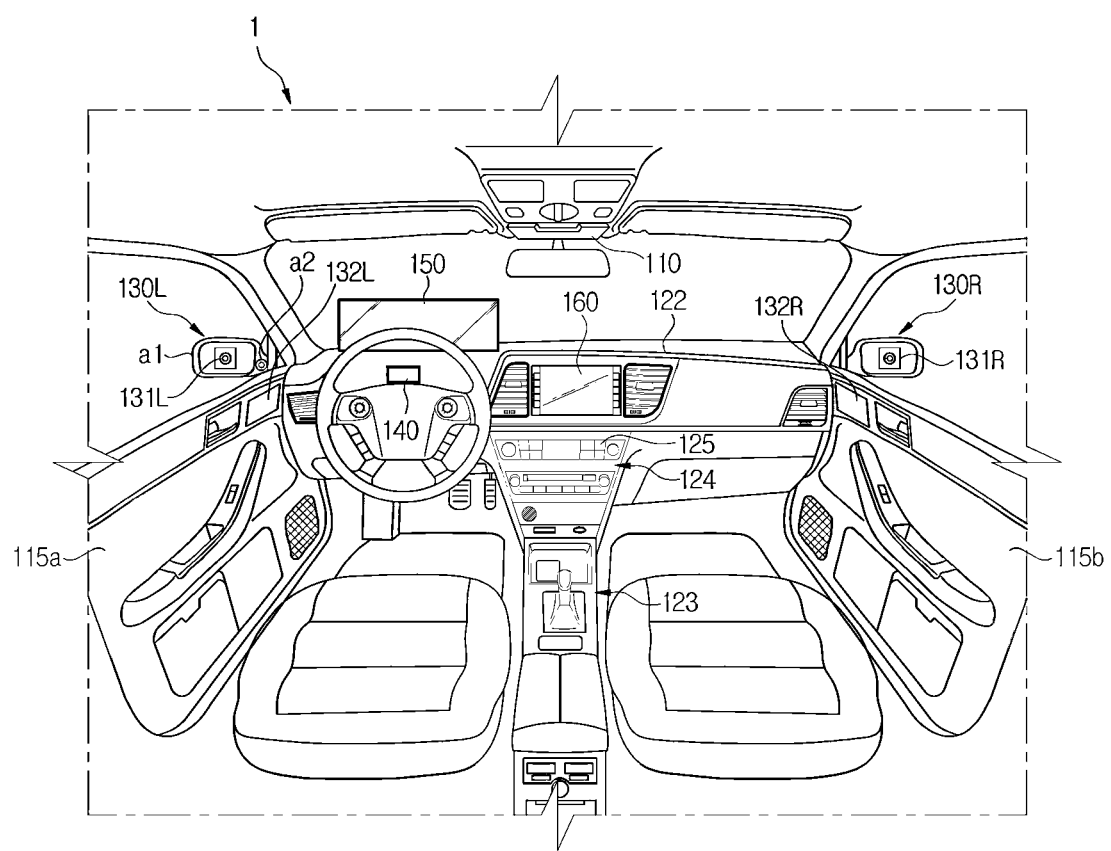
FIG. 1 illustrates an interior of a vehicle according to an exemplary embodiment of the present disclosure.

It may be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Throughout the specification, like reference numerals refer to like elements. The present specification does not describe all the elements of the embodiments, and general contents in the field of the present disclosure or duplicative contents between embodiments will be omitted.

Throughout the specification, when a part is referred to as being "connected" to another part, it includes not only a direct connection but also an indirect connection, and the indirect connection includes connecting through a wireless network.

When it is described that a part "includes" an element, it means that the element may further include other elements, not excluding the other elements unless specifically stated otherwise.

The singular forms "a", "an", and "the" include plural referents unless the context clearly dictates otherwise.

Also, terms such as "~part," "~group," "~block," "~member," and "~module" may mean a unit of processing at least one function or operation. For example, the terms may mean at least one process processed by at least one hardware such as a field-programmable gate array (FPGA)/application specific integrated circuit (ASIC), at least one software stored in a memory, or a processor.

In each step, an identifying numeral is used for convenience of explanation, the identifying numeral does not describe the order of the steps, and each step may be performed differently from the order specified unless the context clearly states an order.

Hereinafter, embodiments of a vehicle and a control method thereof will be described in detail with reference to the accompanying drawings.

FIG. 1 illustrates an interior of a vehicle according to an exemplary embodiment of the present disclosure.

Referring to FIG. 1, seats, a dashboard 122, a center fascia 123, and a head unit 124 may be provided inside a vehicle 1. A camera 110 may be provided on a front windshield of the vehicle 1. The vehicle 1 may include a transparent display 150 provided in the dashboard 122 to face the front of a driver and provided to descend inside the dashboard 122 or to ascend above the dashboard 122. Also, a center display 160 may be provided on the dashboard 122. Furthermore, displays may be provided at various positions inside the vehicle 1. The center display 160 may be omitted.

The camera 110 may photograph the front and obtain front image data. The camera 110 may include a plurality of lenses and an image sensor. The image sensor may include a plurality of photodiodes to convert light into an electrical signal, and the plurality of photodiodes may be arranged in a two-dimensional matrix.

The vehicle 1 may include a digital side mirror or 130 (130L, and 130R) to provide the driver with views of a rear and rear lateral of the vehicle 1. The digital side mirror 130 (130L, and 130R) may be provided on the door 115, photograph the rear lateral of the vehicle 1 to obtain a rear lateral image, and output the rear lateral image. At least one of the digital side mirror 130 may be provided.

For example, the digital side mirror 130 (130L and 130R) may include the first digital side mirror 130L provided adjacent to an A-pillar of a driver seat door 115a, and the second digital side mirror 130R provided adjacent to the A-pillar of a passenger seat door 115b. The first digital side mirror 130L may have a field of view toward a rear left RL, and the second digital side mirror 130R may have a field of view toward a rear right RR.

The digital side mirror 130 may include side cameras 131L and 131R and side displays 132L and 132R. The first digital side mirror 130L may include the first side camera 131L and the first side display 132L. The first side display 132L may output a rear left image obtained by the first side camera 131L. The first side display 132L may be provided on a driver seat side. For example, the first side display 132L may be provided at an internal side of the driver seat door 115a, a portion of the dashboard 122 adjacent to the driver seat door 115a, or at an internal side of the A-pillar of the driver seat door 115a.

The second digital side mirror 130R may include the second side camera 131R and the second side display 132R. The second side display 132R may output a rear right image obtained by the second side camera 131R. The second side display 132R may be provided on a passenger seat side. For example, the second side display 132R may be provided at an internal side of the passenger seat door 115b, a portion of the dashboard 122 adjacent to the passenger seat door 115b, or at an internal side of the A-pillar of the passenger seat door 115b.

The digital side mirrors 130 (130L and 130R) may also include a housing a1 provided to protect the side camera 131 (131L and 131R), and a folding portion a2 provided to automatically fold or unfold the housing a1. For example, when the ignition of the vehicle 1 is turned off or a remote controller such as a smart key is moved from the vehicle 1 by more than a predetermined distance, the housing a1 may be folded toward the door 115 by the folding portion a2. Conversely, when the ignition of the vehicle 1 is turned on or the remote controller such as the smart key is located within the predetermined distance from the vehicle 1, the housing a1 may be unfolded in a direction opposite to the folding direction by the folding portion a2.

A driver sensor 140 may be provided inside the vehicle 1. The driver sensor 140 which is an image sensor may be implemented by a camera. The driver sensor 140 may photograph the driver and obtain a driver image. There is no particular limitation on a location where the driver sensor 140 is provided. Because the driver mostly looks forward when driving the vehicle 1, it is appropriate for the driver sensor 140 to be provided at a position in front of the driver. For example, the driver sensor 140 may be provided on the dashboard 122 or provided on a ceiling above the driver seat.

The transparent display 150 is configured as an instrument panel (cluster) and/or an infotainment device. The infotainment device may also be referred to as an audio video navigation (AVN) device. As the transparent display 150 is provided, a conventional cluster display hidden by a steering wheel may be omitted.

The transparent display 150 may display vehicle state information and driving information. The center display 160 may also output a variety of information related to a function, state, and/or operation of the vehicle 1. For example, the transparent display 150 may include a tachometer, a speedometer, a coolant thermometer, a fuel gauge, direction indicator lamps, high beam indicator lamps, a warning light, a seat belt warning light, a tachometer, an odometer, an automatic shift selector indicator lamp, a door open warning light, an engine oil warning light, and a fuel shortage warning light.

The transparent display 150 and/or the center display 160 may output a graphical user interface (GUI) including graphic elements (e.g., icons, texts, images) for executing or setting various functions of the vehicle 1. The graphical user interface (GUI) may interact with input of a user. The transparent display 150 and/or the center display 160 may output a screen corresponding to an input to an object. For example, the transparent display 150 and/or the center display 160 may display a driving route to a destination set by the driver and display various graphic user interfaces for guiding the driving route.

Various input devices 125 may be provided on the center fascia 123 and the head unit 124. Furthermore, the input devices may be provided on a steering device (steering wheel), an arm rest, a door handle, and seats. The input device 125 may include buttons, dials, and/or touchpads related to various functions of the vehicle 1. For example, the input device 125 may include a push button, a touch button, a touch pad, a touch screen, a dial, a stick-type operation device, and/or a track ball.

The vehicle 1 may include a sound device. At least one sound device may be provided, and may be provided on the dashboard and/or inside the door. A sound (e.g., a voice, a warning sound) related to the function, state, and/or operation of the vehicle 1 may be output through the sound device. The sound device may include at least one speaker.

Furthermore, the vehicle 1 may include various devices for driving the vehicle 1. For example, the vehicle 1 may include a power generating device, a power transmitting device, a driving assistance device, the steering device, a brake device, an accelerator device, a suspension device, a transmission device, a fuel device, wheels and/or a battery. The vehicle 1 may also include a plurality of electronic components. For example, the vehicle 1 may include an electronic steering system, a body control module, a driver assistance system, and a navigation system 170.

The electronic components of the vehicle 1 may communicate with each other through a vehicle communication network NT. For example, the electronic components may transmit and receive data using a communication network such as Ethernet, Media Oriented Systems Transport (MOST), Flexray, Controller Area Network (CAN) and/or Local Interconnect Network (LIN).

Figure 2:
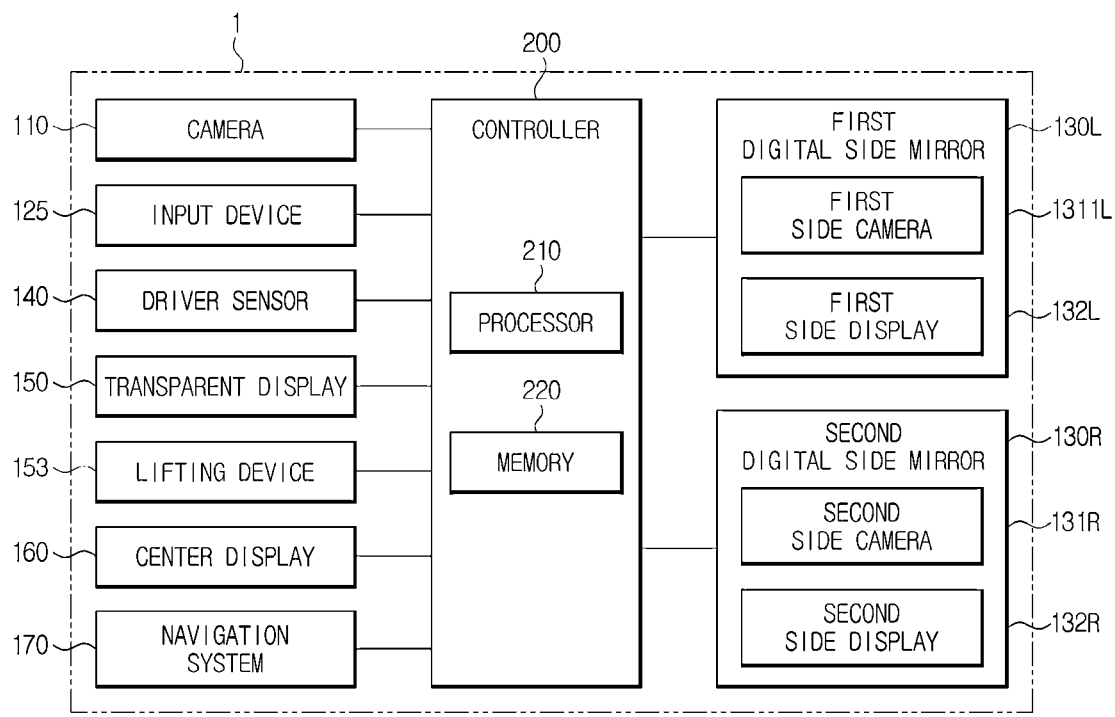
FIG. 2 is a control block diagram of the vehicle according to an exemplary embodiment of the present disclosure.
Figure 3:
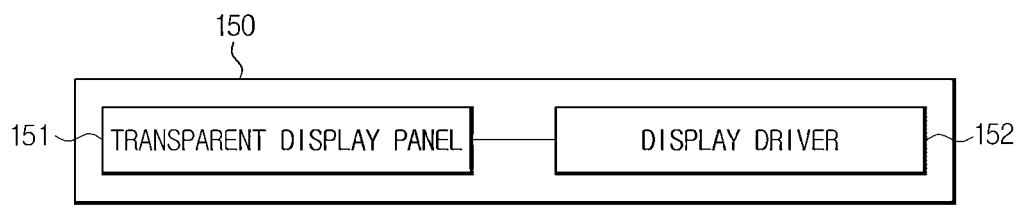
FIG. 3 is a control block diagram of a transparent display according to an exemplary embodiment of the present disclosure.

FIG. 2 is a control block diagram of the vehicle according to an exemplary embodiment of the present disclosure. FIG. 3 is a control block diagram of a transparent display according to an exemplary embodiment of the present disclosure.

Referring to FIG. 2, the vehicle 1 may include the camera 110, the input device 125, the first digital side mirror 130L, the second digital side mirror 130R, the driver sensor 140, the transparent display 150, a lifting device 153, the center display 160, the navigation system 170, and a controller 200. The controller 200 may be electrically connected to devices included in the vehicle 1 and may control each device.

The camera 110 may photograph the front and obtain front image data. The front image data may include information related to an object (e.g., other vehicle, a pedestrian) and/or a lane located in front of the vehicle 1. The vehicle 1 may include cameras provided at other locations other than the camera 110 provided on the front windshield. For example, the vehicle 1 may further include a side camera provided on a side surface of the vehicle 1 to obtain side image data of the vehicle 1, and a rear camera provided on a rear surface of the vehicle 1 to obtain rear image data of the vehicle 1.

The input device 125 may obtain input of the user. For example, the input device 125 may include a direction indicator lever, and may obtain the input of the user of manipulating the direction indicator lever to blink the direction indicator lamps. The steering device (steering wheel) for controlling a moving direction of the vehicle 1 may also be defined as being included in the input device 125.

The first digital side mirror 130L may include the first side camera 131L and the first side display 132L. The first side display 132L may output the rear left image obtained by the first side camera 131L. The second digital side mirror 130R may include the second side camera 131R and the second side display 132R. The second side display 132R may output the rear right image obtained by the second side camera 131R.

The first side display 132L, the second side display 132R, and the center display 152 may each include a light emitting diode (LED) panel, an organic light emitting diode (OLED) panel, or a liquid crystal display (LCD) panel. Also, the first side display 132L, the second side display 132R, and the center display 160 may include a touch screen to obtain touch input of the user.

The driver sensor 140 may photograph the driver and obtain a driver image. The driver sensor 140 which is an image sensor may be implemented by a camera. The driver sensor 140 may also include a face analysis device configured for analyzing a facial expression of the user, and an eye tracker configured for tracking a position of a pupil. The driver sensor 140 may be provided in various positions inside the vehicle 1, but it is suitable for the driver sensor 140 to be provided in a position in front of the driver.

The vehicle 1 may also include various types of sensors to detect objects around the vehicle 1 and obtain object data. For example, the sensors may detect an object located on the rear lateral of the vehicle 1, and obtain object data such as a type of the object located on the rear lateral, a position of the object, a moving speed of the object, and a distance to the object. The sensors may transmit the obtained object data to the controller 200. The sensors may include an image sensor and/or radar, and obtain object data such as a type of an object (e.g., other vehicle, a pedestrian, a lane, a road sign, a traffic light), a position of the object, a speed of the object, and a distance to the object. One or more sensors may be provided and provided in the front, rear and/or corners of the vehicle 1.

The transparent display 150 and the center display 160 may be provided on the dashboard 122. The transparent display 150 and the center display 160 may output a variety of information related to the function, state, and/or operation of the vehicle 1. The center display 160 may be omitted.

Referring to FIG. 3, the transparent display 150 may include a transparent display panel 151 and a display driver 152. The transparent display panel 150 may be a transparent liquid crystal display (LCD) panel or a transparent organic light emitting diode (OLED) panel. The transparent display panel 151 may transmit natural light to maintain a transparent state. The transparent display panel 151 may display an image according to a signal transmitted from the display driver 152. The transparent display 150 may also include a touch screen to obtain touch input of the user.

The display driver 152 may be provided below the dashboard 122 and include at least one circuit board. The display driver 152 may supply power to the transparent display panel 151 under the control of the controller 200 and transmit a signal to the transparent display panel 151. The controller 200 may control the transparent display panel 151 to display an image by transmitting a control signal to the display driver 152, and may adjust transparency and/or brightness of the transparent display panel 151. For example, the controller 200 may adjust the transparency of the transparent display 150 based on a driving mode.

Because the transparent display 150 may display an image by emitting light directly, the transparent display 150 may have better visibility than a conventional head-up display.

Referring back to FIG. 2, the lifting device 153 may be provided below the dashboard 122 to ascend or descend the transparent display 150. The controller 200 may control the lifting device 153 to adjust an ascending height of the transparent display 150. The controller 200 may determine the ascending height of the transparent display 150 based on the driving mode. The transparent display 150 may be exposed above the dashboard 122 or hidden below the dashboard 122 by the lifting device 153.

The navigation system 170 may obtain current location information of the vehicle 1 and guide a driving route from the current location to a destination set by the driver. The driving route set by the navigation system 170 may be displayed through the transparent display 150 and/or the center display 160.

For example, the transparent display 150 may display graphics element for left turn guidance, right turn guidance, or lane change guidance based on the driving route. The transparent display 150 may display various graphic elements as augmented reality images. The augmented reality image refers to a virtual image which is synthesized in a real environment and appears to exist in the real environment.

The controller 200 may be electrically connected to electronic devices of the vehicle 1 to control each device. The controller 200 may include a processor 210 and a memory 220. The memory 220 may store a program, an instruction, and/or an application for performing a vehicle remote control method. The processor 210 may execute the program, the instruction, and/or the application stored in the memory 220. A plurality of processors 210 and the memories 220 may be provided. The controller 200 may include control units such as an electronic control unit (ECU) and a micro-controller unit (MCU).

The memory 220 may include a non-volatile memory device such as a cache, a read only memory (ROM), a programmable ROM (PROM), an erasable programmable ROM (EPROM), an electrically erasable programmable ROM (EEPROM), and a flash memory. Also, the memory 220 may include a volatile memory device such as a random access memory (RAM) and include a storage medium such as a Hard Disk Drive (HDD) and CD-ROM. The type of the memory 220 is illustrative and not limited thereto.

In addition to the above-described configurations, the vehicle 1 may include various devices. Also, some of the above-described configurations may be removed from the vehicle 1. Hereinafter, a method of controlling the vehicle 1 will be specifically described.

Figure 4:
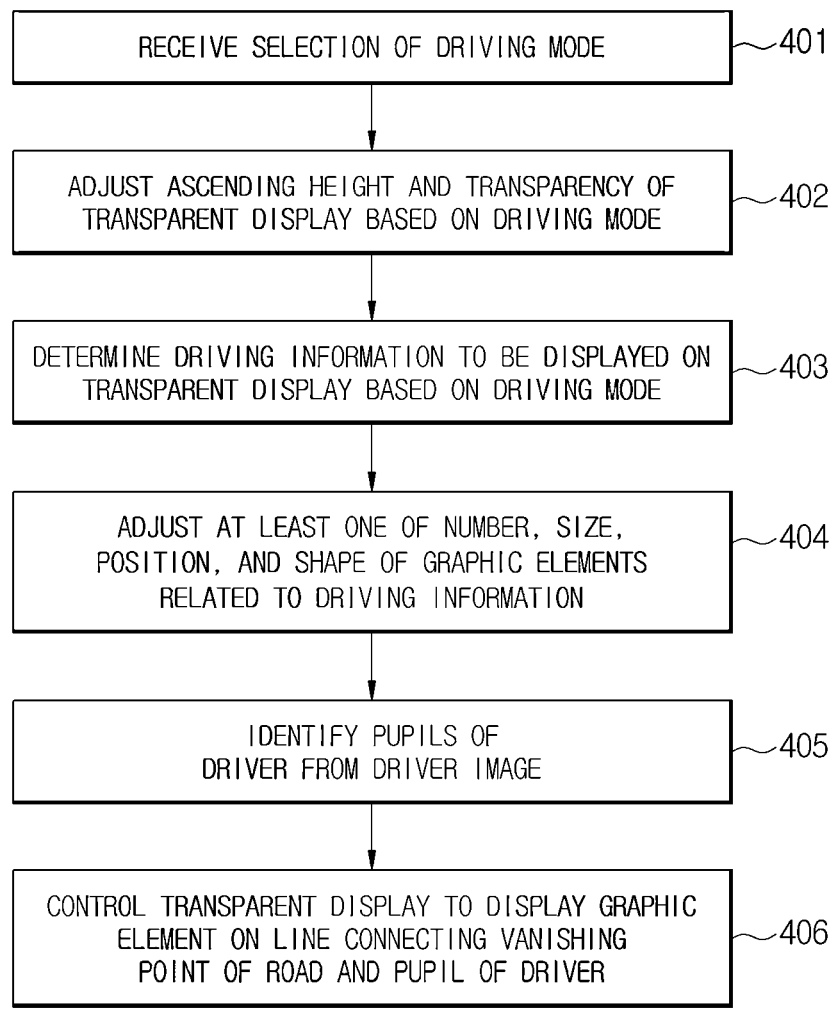
FIG. 4 is a flowchart for explaining a method of controlling the vehicle according to an exemplary embodiment of the present disclosure.

FIG. 4 is a flowchart for explaining a method of controlling the vehicle according to an exemplary embodiment of the present disclosure.

Referring to FIG. 4, the controller 200 may receive a selection of the driving mode from the input device 125 (401). The input device 125 may obtain the user input selecting the driving mode and transmit a driving mode selection signal to the controller 200. The controller 200 may identify the selected driving mode according to a signal transmitted from the input device 125. For example, the driving mode may be selected as a manual driving mode or an autonomous driving mode.

The controller 200 may adjust the ascending height of the transparent display 150 and/or the transparency of the transparent display 150 according to the driving mode (402). For example, the controller 200 may adjust the ascending height of the transparent display 150 to a predetermined first height based on the manual driving mode, and may adjust the ascending height of the transparent display 150 to a second height higher than the first height based on the autonomous driving mode.

The controller 200 may also adjust the transparency of the transparent display 150 to a predetermined first transparency value based on the manual driving mode, and may adjust the transparency of the transparent display 150 to a second transparency value lower than the first transparency value based on the autonomous driving mode.

The controller 200 may determine driving information to be displayed on the transparent display 150 according to the driving mode (403). For example, first driving information displayed on the transparent display 150 in the manual driving mode and second driving information displayed on the transparent display 150 in the autonomous driving mode may be different from each other.

The controller 200 may adjust at least one of a number of graphic element, size of the graphic element, position of the graphic element, or shape of the graphic element related to the driving information (404). For example, in the controller 200, a first number of the graphic elements related to the driving information displayed on the transparent display 150 in the manual driving mode may be smaller than a second number of the graphic elements related to the driving information displayed on the transparent display 150 in the autonomous driving mode. A first size of the graphic element displayed on the transparent display 150 in the manual driving mode may be smaller than a second size of the graphic element displayed on the transparent display 150 in the autonomous driving mode.

A first position and/or a first shape of the graphic element displayed on the transparent display 150 in the manual driving mode may be different from a second position and/or the first shape of the graphic element displayed on the transparent display 150 in the autonomous driving mode.

For example, the controller 200, in accordance with execution of a multimedia application in the autonomous driving mode, may divide a screen area of the transparent display 150 into a first region in which the driving information is displayed and a second region in which multimedia information by execution of a multimedia application is displayed. The controller 200 may control the transparent display 150 to display a first graphic element related to the driving information in the first region and display a second graphic element related to the multimedia information in the second region.

As an exemplary embodiment of the present disclosure, the controller 200 may control the transparent display 150 to hide the driving information based on the execution of the multimedia application in the autonomous driving mode, and may control the transparent display 150 to provide the driving information in a pop-up form in response to a situation in which a display of the driving information is required.

The controller 200 may also identify roads, lanes and other vehicles from the front image data obtained by the camera 110, and may control the transparent display 150 so that the graphic elements related to the driving information are displayed at positions corresponding to the roads, lanes, and other vehicles.

The controller 200 may identify pupils of the driver based on the driver image (405). The controller 200 of the vehicle 1 may control the driver sensor 140 to obtain the driver image and receive the driver image from the driver sensor 140. The driver image may include facial movement and pupil movement of the driver. The driver may turn a head of the driver or move the pupils of the driver to look forward, left or right while driving. The controller 200 may analyze the pupil movement of the driver to identify a direction the driver is looking, that is, a gaze direction of the driver.

Also, the controller 200 may control the transparent display 150 to display the graphic element on a line connecting a vanishing point of a road and the pupil of the driver (406). The controller 200 may identify the vanishing point of the road from the front image data obtained by the camera 110. The controller 200 may identify the vanishing point based on a lane. The vanishing point may be identified as a point where both lanes converge in the front image data. By causing the graphic element to be displayed on the line connecting the vanishing point of the road and the pupil of the driver, even when the driver does not change an eye level by himself, the graphic element displayed on the transparent display 150 may be clearly seen.

Figure 5:
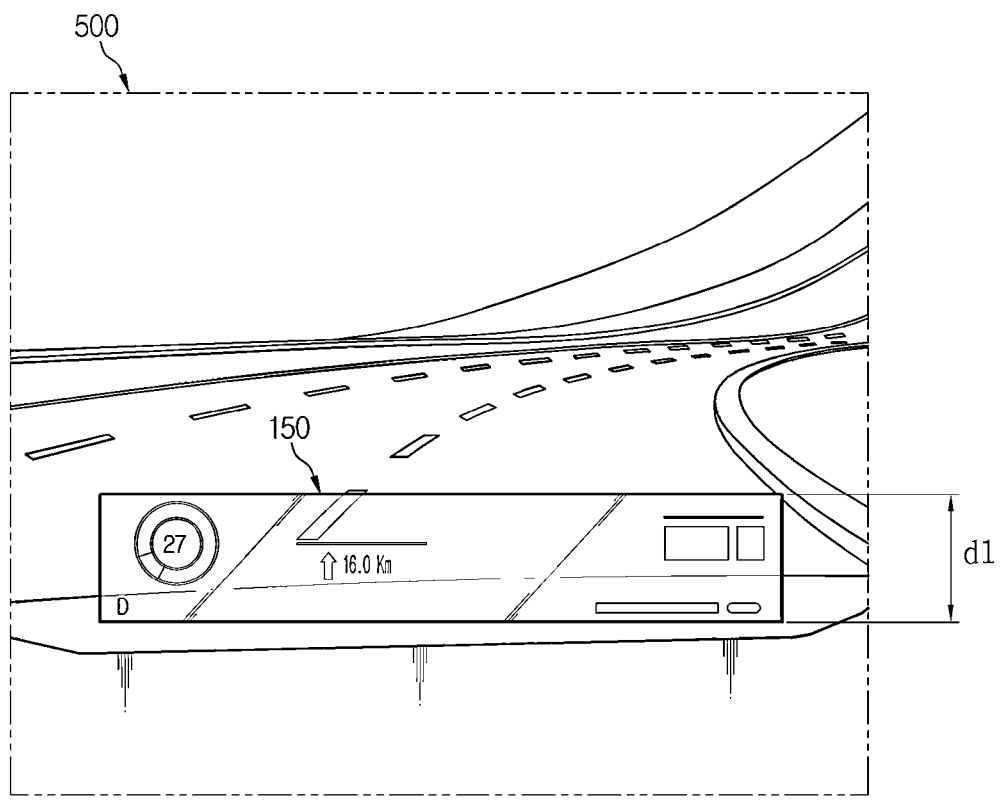
FIG. 5 illustrates a state of the transparent display in a manual driving mode.
Figure 6:
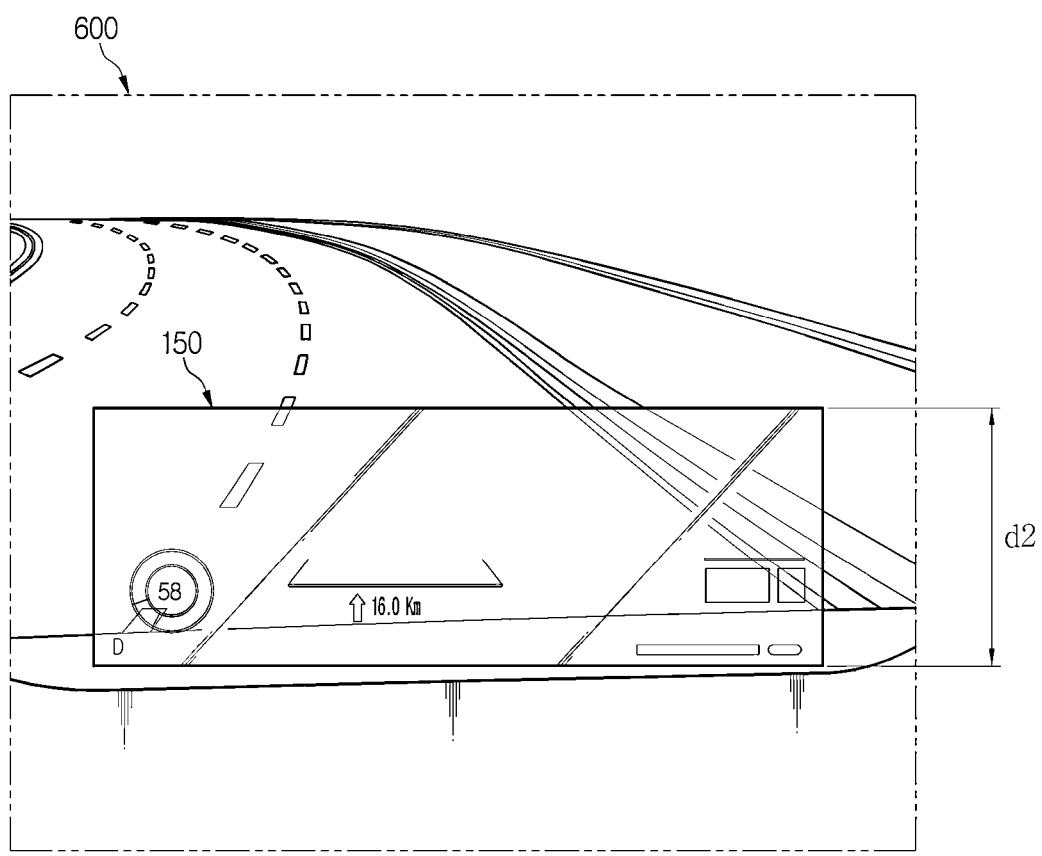
FIG. 6 illustrates a state of the transparent display in an autonomous driving mode.

FIG. 5 illustrates a state of the transparent display in the manual driving mode. FIG. 6 illustrates a state of the transparent display in the autonomous driving mode.

Referring to FIG. 5, the controller 200 may adjust the ascending height of the transparent display 150 to a predetermined first height d1 based on the manual driving mode. Referring to FIG. 6, the controller 200 may adjust the ascending height of the transparent display 150 to a second height d2 higher than the first height d1 based on the autonomous driving mode.

Because the driver is directly involved in driving in the manual driving mode, it is necessary to provide the driver with a wider forward field of view. Therefore, when the manual driving mode is selected, the controller 200 may control the transparent display 150 to lower the height of the transparent display 150 and provide essential information for driving.

In the autonomous driving mode, a subject involved in driving is mainly the vehicle 1, and the driver is indirectly or auxiliary involved in driving. Because the need for the driver to secure the front field of view is relatively low, the height of the transparent display 150 may be adjusted to be high. That is, an area in which the transparent display 150 may display information may be increased. When the autonomous driving mode is selected, the controller 200 may control the transparent display 150 to display a variety of multimedia information corresponding to a request of the user as well as information essential for driving.

Also, the controller 200 may adjust the transparency of the transparent display 150 to the predetermined first transparency value based on the manual driving mode. The controller 200 may adjust the transparency of the transparent display 150 to the second transparency value lower than the first transparency value based on the autonomous driving mode. Because the driver is directly involved in driving in the manual driving mode, the transparency of the transparent display 150 may be increased to provide a wider front field of view to the driver. In the autonomous driving mode, a clearer image quality may be provided by decreasing the transparency of the transparent display 150 and increasing a contrast ratio. In other words, the graphic element displayed through the transparent display 150 may be seen more clearly by displaying a difference between a dark portion and a bright portion to be larger.

Figure 7:
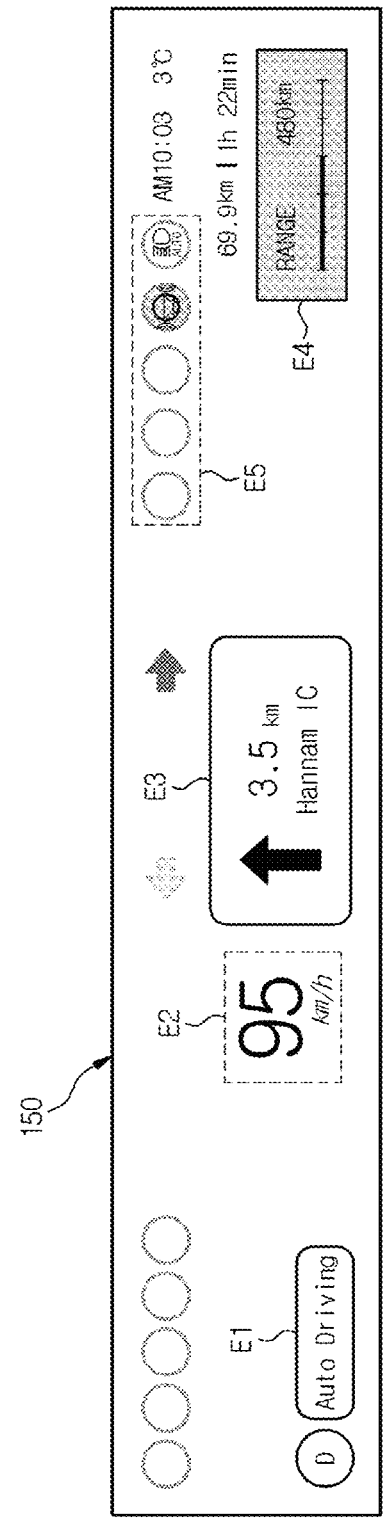
FIG. 7 illustrates graphic elements displayed on the transparent display in FIG. 5.
Figure 8:
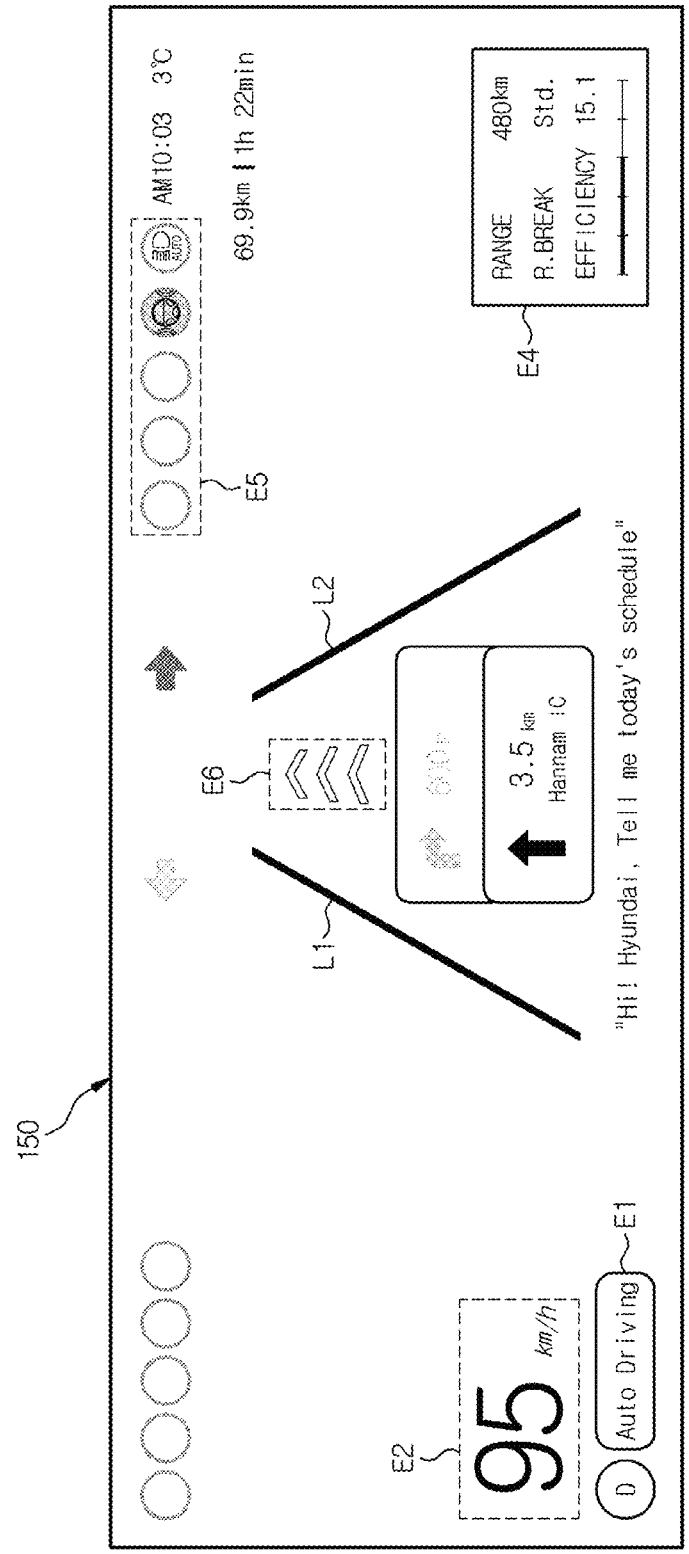
FIG. 8 illustrates graphic elements displayed on the transparent display in FIG. 6.

FIG. 7 illustrates graphic elements displayed on the transparent display in FIG. 5. FIG. 8 illustrates graphic elements displayed on the transparent display in FIG. 6.

Referring to FIGS. 7 and 8, the transparent display 150 may display the driving information including various graphic elements. The graphic elements related to the driving information displayed in the manual driving mode may be different from the graphic elements related to the driving information displayed in the autonomous driving mode. The graphic elements displayed on the transparent display 150 are not limited to those illustrated in FIGS. 7 and 8.

FIG. 7 illustrates the driving information displayed on the transparent display 150 in the manual driving mode. For example, in the manual driving mode, the controller 200 may control the transparent display 150 to display driving mode information E1, speed information E2, route guidance information E3, fuel efficiency information E4, and an indicator E5 related to vehicle functions. In the manual driving mode, the route guidance information E3 and the fuel efficiency information E4 may be briefly displayed.

FIG. 8 illustrates the driving information displayed on the transparent display 150 in the autonomous driving mode. For example, in the autonomous driving mode, the controller 200 may control the transparent display 150 to display the driving mode information E1, the speed information E2, the route guidance information E3, the fuel efficiency information E4, the indicator E5 related to vehicle states, and lane information E6. The lane information E6 may be provided, for example, as an augmented reality image indicating lanes L1 and L2 to be driven. In the autonomous driving mode, the route guidance information E3 and the fuel efficiency information E4 may be displayed in more detail.

The driving mode information E1 may indicate whether the current driving mode is the manual driving mode or the autonomous driving mode. The speed information E2 may indicate a current driving speed. The route guide information E3 may include a place to pass through to reach a destination, a distance to the place to pass through, and a driving direction. The fuel efficiency information E4 may include a drivable distance and current fuel efficiency. The indicator E5 related to the vehicle functions may be displayed as various symbols. For example, the indicator E5 may be displayed as a symbol for notifying a headlight operation, a wiper operation, a lane departure warning, or insufficient tire pressure.

Figure 9:
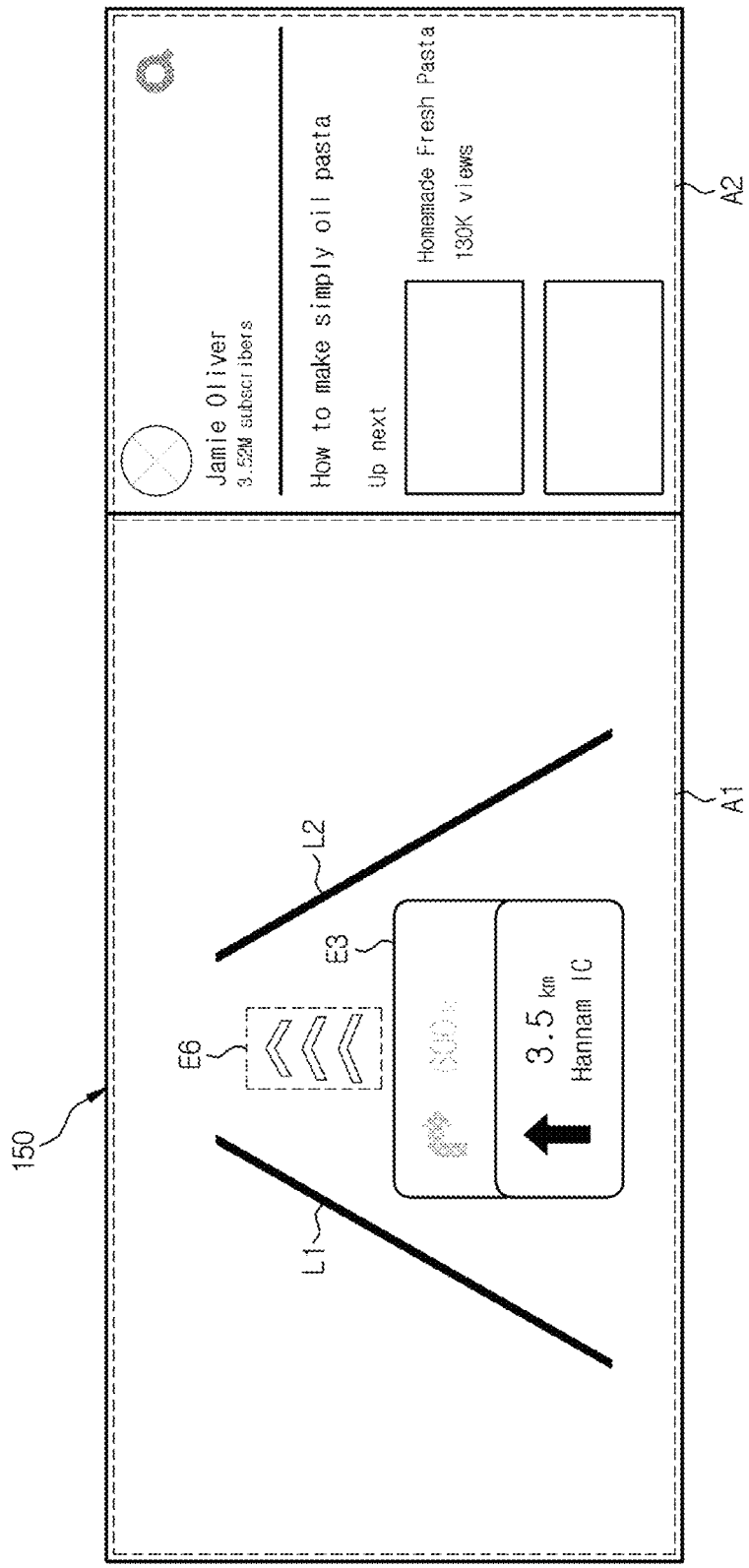
FIG. 9, FIG. 10 and FIG. 11 illustrate examples in which the transparent display operates as an infotainment device.
Figure 10:
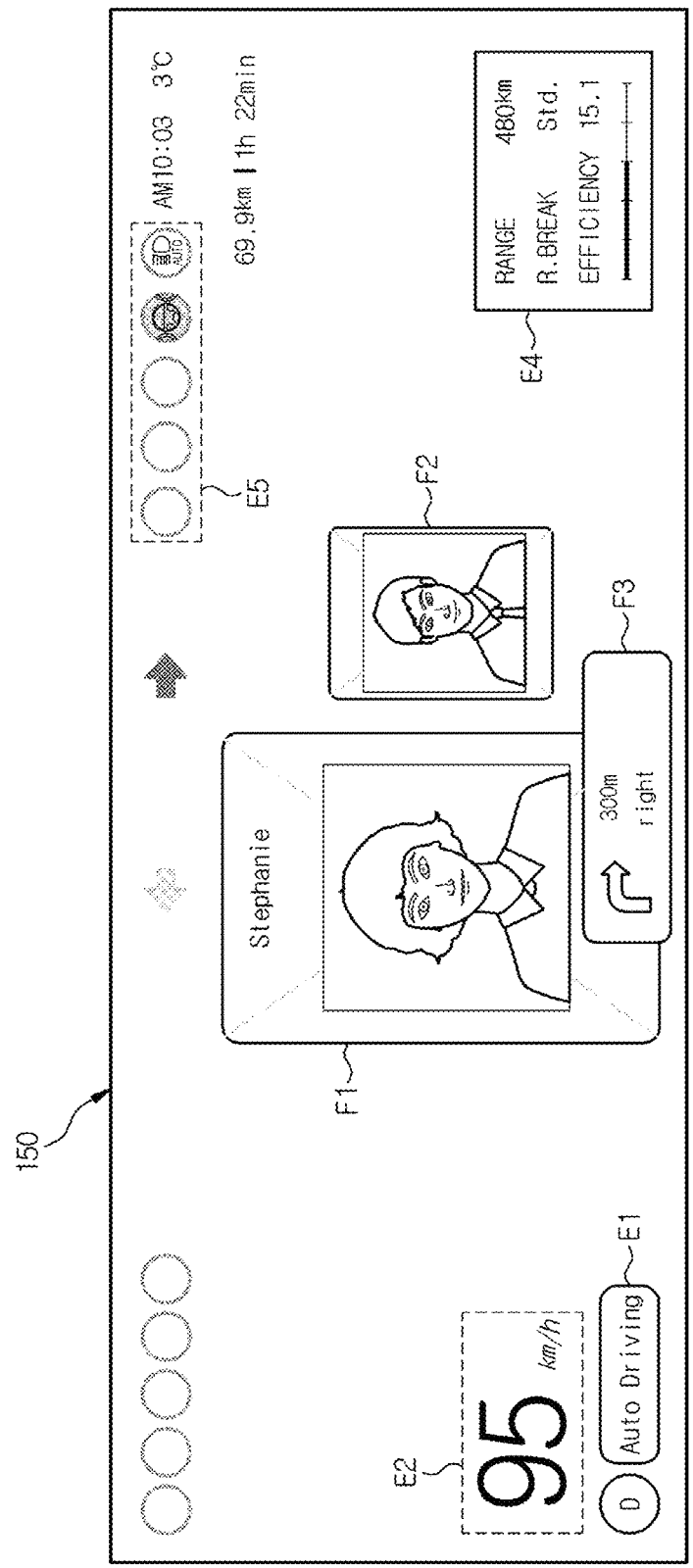
Figure 11:
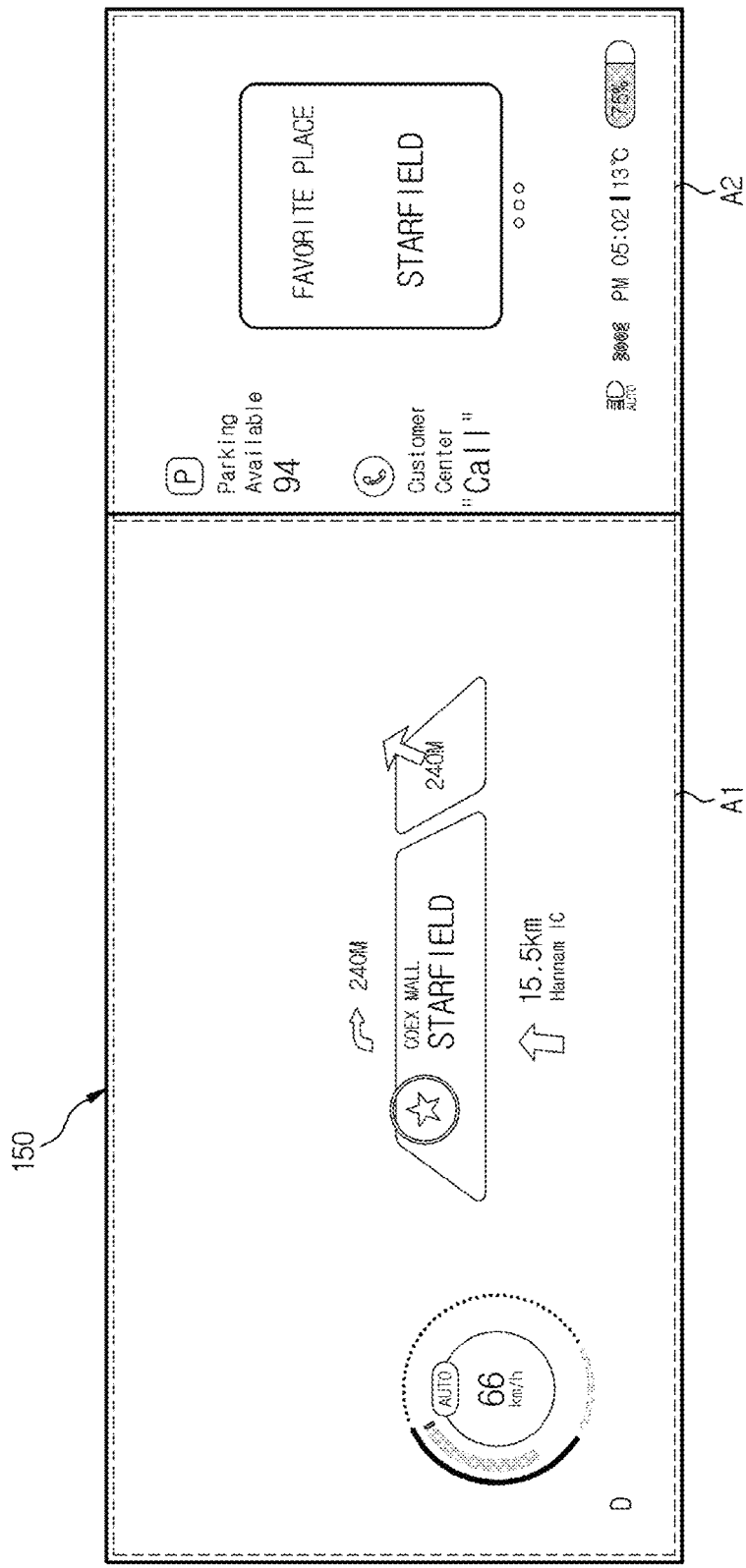

FIG. 9, FIG. 10 and FIG. 11 illustrate examples in which the transparent display operates as an infotainment device.

Referring to FIG. 9, the controller 200, based on the execution of the multimedia application in the autonomous driving mode, may divide the screen area of the transparent display 150 into a first region A1 in which the driving information is displayed and a second region A2 in which the multimedia information by the execution of the multimedia application is displayed. The controller 200 may control the transparent display 150 to display the first graphic element related to the driving information in the first region A1 and display the second graphic element related to the multimedia information in the second region A2. For example, the route guidance information E3 and an augmented reality image E6 may be displayed in the first region A1 as the first graphic element related to the driving information. A user interface element (e.g., a of content being reproduced and a thumbnail of content to be reproduced next) according to execution of a music application may be displayed in the second region A2.

Referring to FIG. 10, based on the execution of the multimedia application in the autonomous driving mode, the controller 200 may control the transparent display 150 to hide some or all of the driving information and provide the driving information in a form of a pop-up in response to the situation in which the display of the driving information is required. For example, based on execution of a video call application in the autonomous driving mode, the controller 200 may control the transparent display 150 to display a counterpart screen F1 and a driver screen F2 and hide the route guidance information E3 and the augmented reality image E6. The controller 200 may also control the transparent display 150 to display a pop-up message F3 informing of a distance to a right turn point in response to a situation in which a right turn is required.

Referring to FIG. 11, the controller 200 may control the transparent display 150 to display information related to a favorite place based on a current location of the vehicle 1 and the favorite place stored or registered in advance. Detailed information of the favorite place may be displayed in the second region A2 of the transparent display 150, and route guidance information to the favorite place may be displayed in the first region A1. Furthermore, on the transparent display 150, a recommended route to a destination may be displayed and a variety of information may be displayed.

FIG. 12, FIG. 13 and FIG. 14A, FIG. 14B and FIG. 14C illustrate methods of controlling the transparent display based on pupils of a driver.

Figure 12:
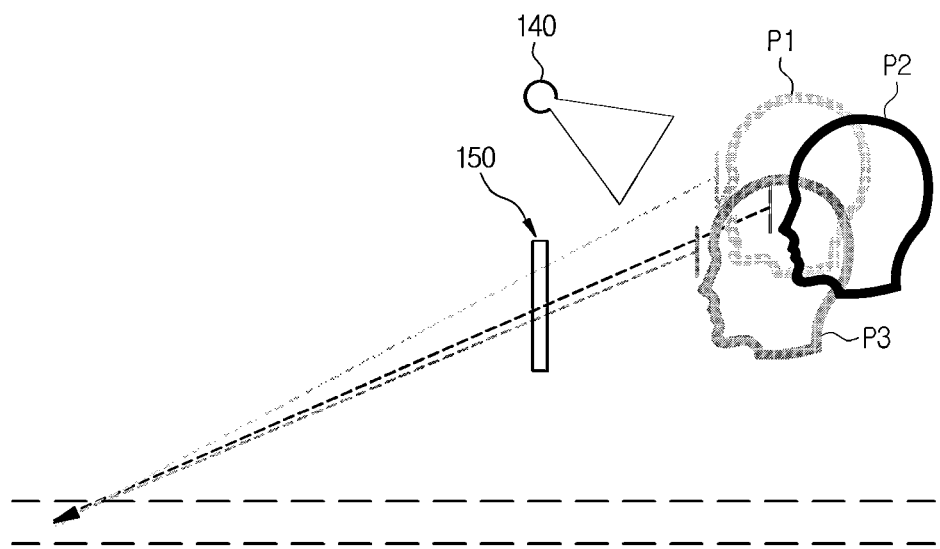
FIG. 12, FIG. 13 and FIG. 14A, FIG. 14B and FIG. 14C illustrate methods of controlling the transparent display based on pupils of a driver.
Figure 13:
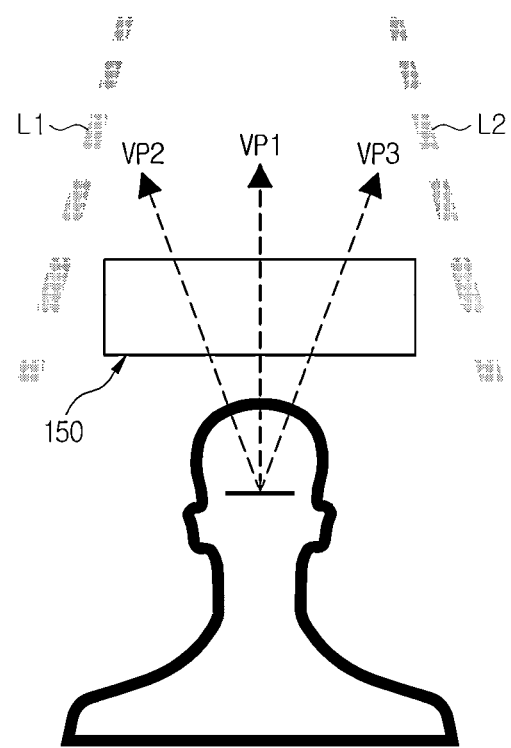

Referring to FIG. 12, and FIG. 13, a pupil position of the driver accommodated in the driver seat may change up, down, left and right depending on a body shape of the driver, movement of the driver, or shaking of the vehicle 1. For example, the pupil of the driver may move to a position P1, a position P2, or a position P3, and a gaze of the driver may also change in a direction VP1, a direction VP2 or a direction VP3. The transparent display 150 may display a graphic element which is an augmented reality image at a position corresponding to a road, a lane, and other vehicle. However, when the display position of the augmented reality image does not change in response to a change in the pupil position of the driver and/or the gaze of the driver, the driver may feel that the augmented reality image is displayed incorrectly and feel inconvenience caused by this.

To solve the present problem, the controller 200 may control the transparent display 150 to display the graphic element on a line connecting a vanishing point of a road and the pupil of the driver. The line connecting the vanishing point of the road and the pupil of the driver may be a straight line or a curved line. The controller 200 may identify the vanishing point based on a lane. The vanishing point may be identified as a point where both lanes converge in the front image data.

Figure 14A:
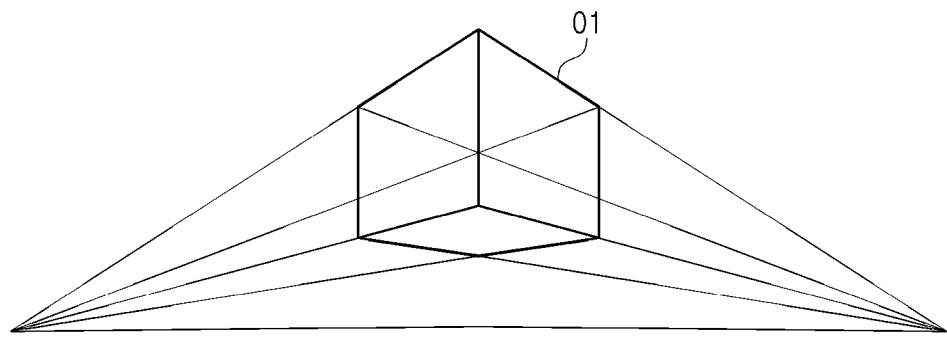
Figure 14B:
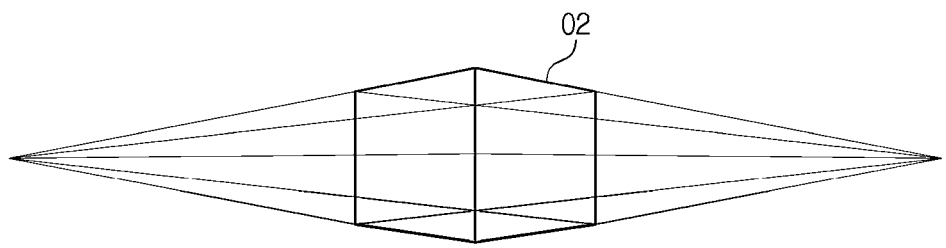
Figure 14C:
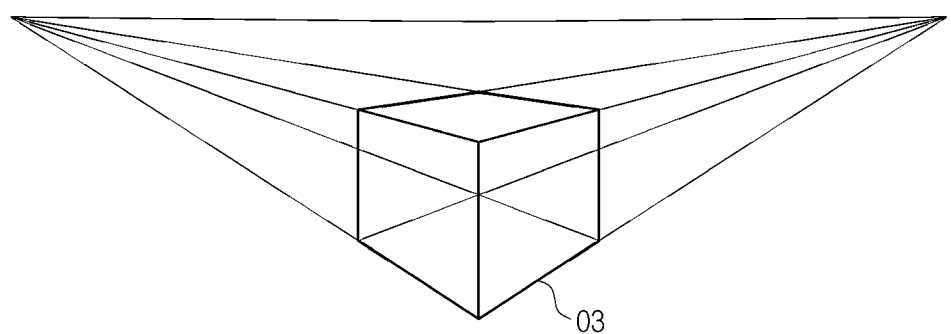

For example, a graphic element O1 shown in FIG. 14A may be displayed to correspond to the position P1 in FIG. 12, a graphic element O2 shown in FIG. 14B may be displayed to correspond to the position P2 in FIG. 12, and a graphic element O2 shown in FIG. 14C may be displayed to correspond to the position P3 in FIG. 12.

Figure 15:
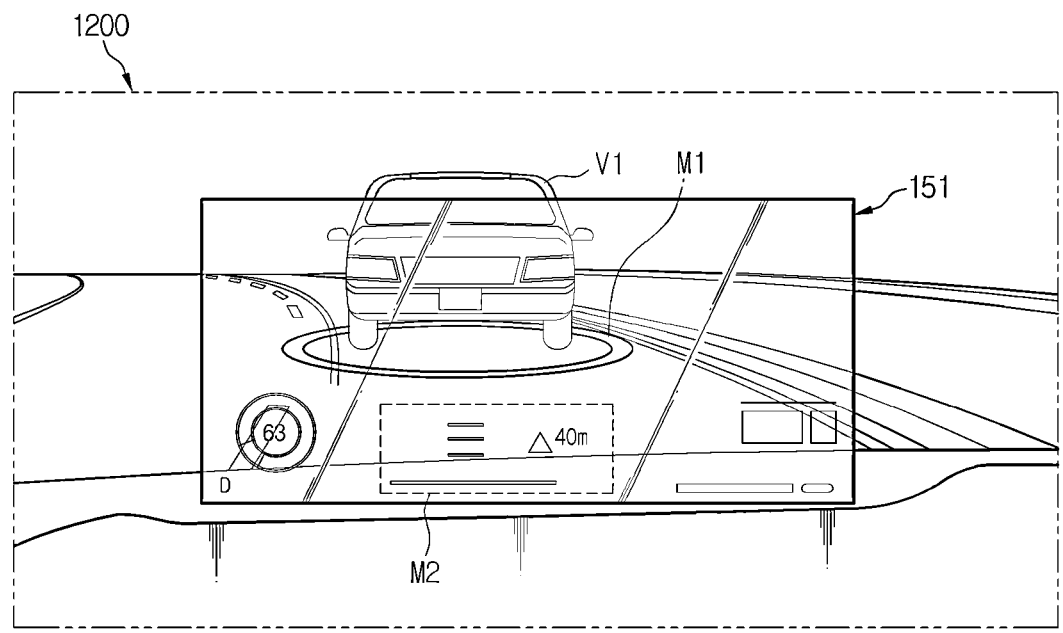
FIG. 15, FIG. 16 and FIG. 17 illustrate examples in which augmented reality images are displayed through the transparent display.
Figure 16:
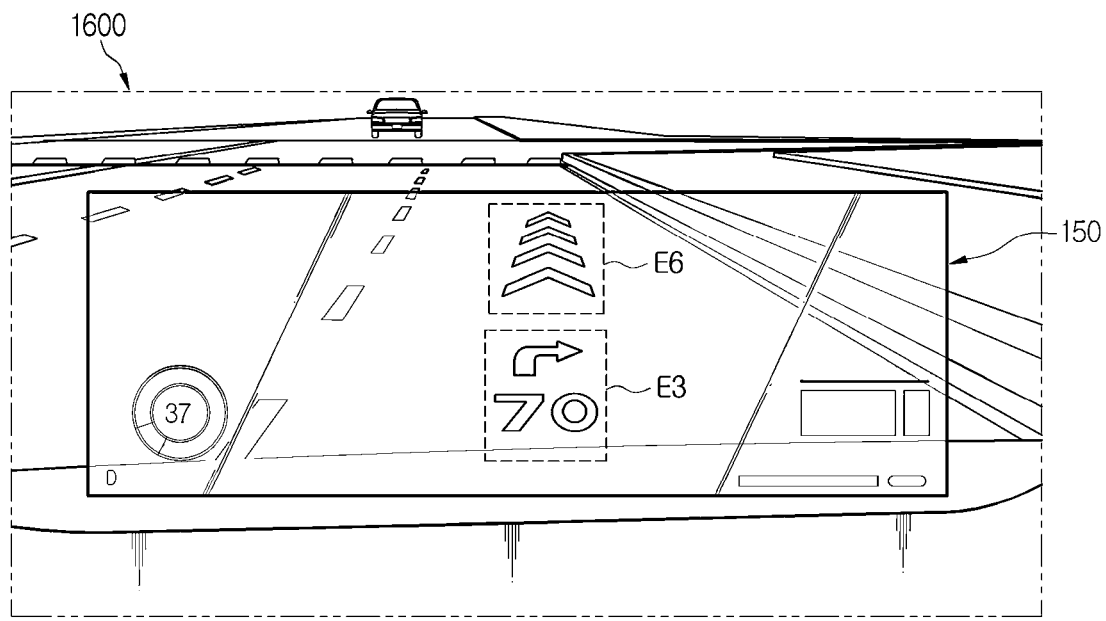
Figure 17:
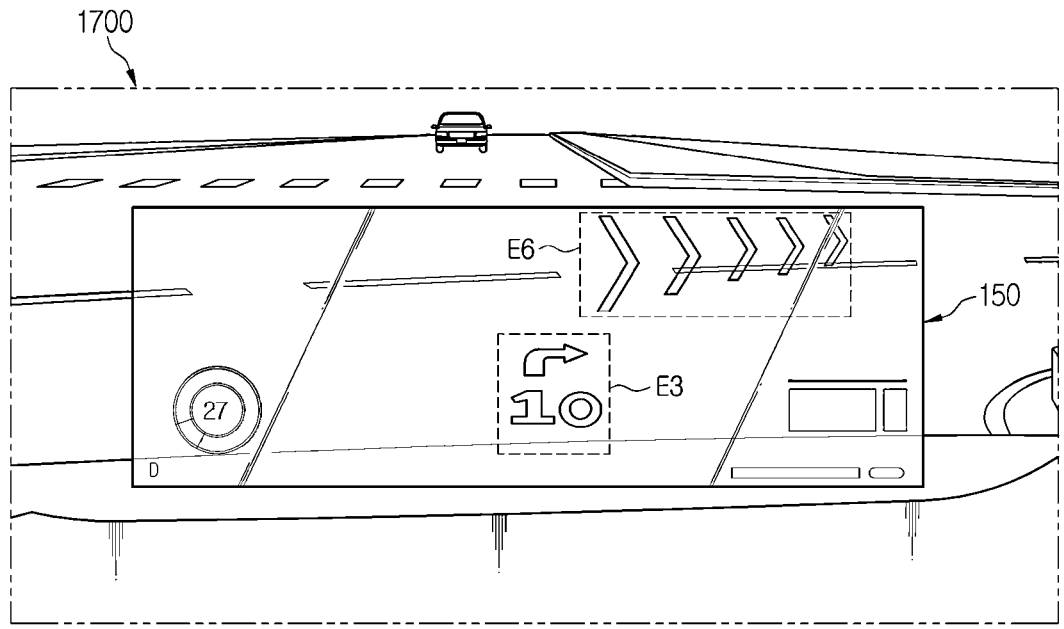

FIG. 15, FIG. 16 and FIG. 17 illustrate examples in which augmented reality images are displayed through the transparent display.

Referring to FIG. 15, the controller 200 may control the transparent display 150 to display a graphic element which is an augmented reality image at a position corresponding to a road, a lane, and other vehicle. For example, the controller 200 may identify a road and other vehicle V1 from the front image data obtained by the camera 110 and control the transparent display 150 to display a mark M1 indicating the other vehicle V1. The mark M1 may be displayed as an augmented reality image. The mark M1 displayed in the screen area of the transparent display 150 may overlap the other vehicle V1 on the road and appear to exist on the actual road.

Also, the controller 200 may control the transparent display 150 to display inter-vehicle distance information M2 indicating a distance to the other vehicle V1. The inter-vehicle distance information M2 may also be provided as an augmented reality image. The driver may experience an augmented reality 1200 in which a front environment and the transparent display 150 are superimposed.

Referring to FIGS. 16 and 17, the transparent display 150 may display, as an augmented reality image, the route guidance information E3 including a place to pass through, a distance to the place to pass through, and a driving direction. The transparent display 150 may also provide the lane information E6 indicating a lane in which to drive as an augmented reality image. For example, when the vehicle 1 is required to turn right at an intersection, an image indicating straight ahead in the current lane may be displayed until reaching the intersection, and an image instructing to turn right may be displayed when reaching the intersection. The augmented reality image may be displayed on a line connecting a vanishing point of a road and the pupil of the driver. The line connecting the vanishing point of the road and the pupil of the driver may be a straight line or a curved line. The driver may experience augmented realities 1600 and 1700 in which the front environment and the transparent display 150 are superimposed.

Figure 18:
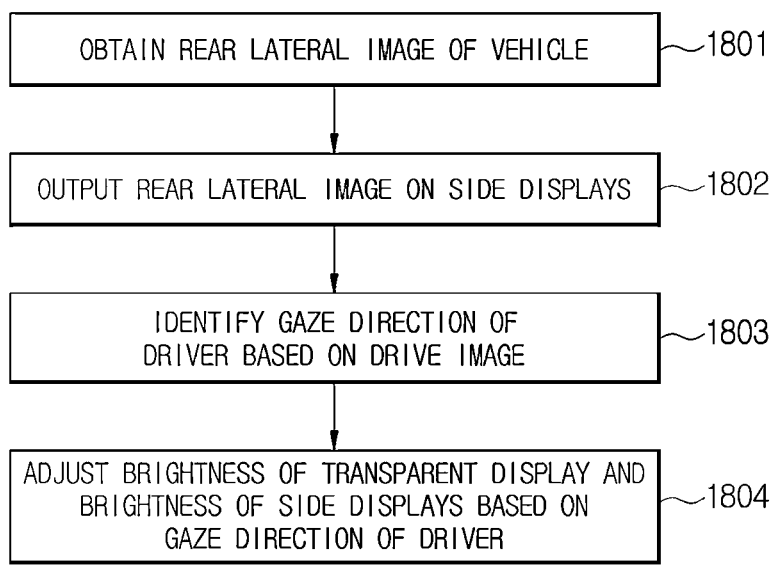
FIG. 18 is a flowchart for explaining a method of controlling a vehicle according to another exemplary embodiment of the present disclosure.
Figure 19:
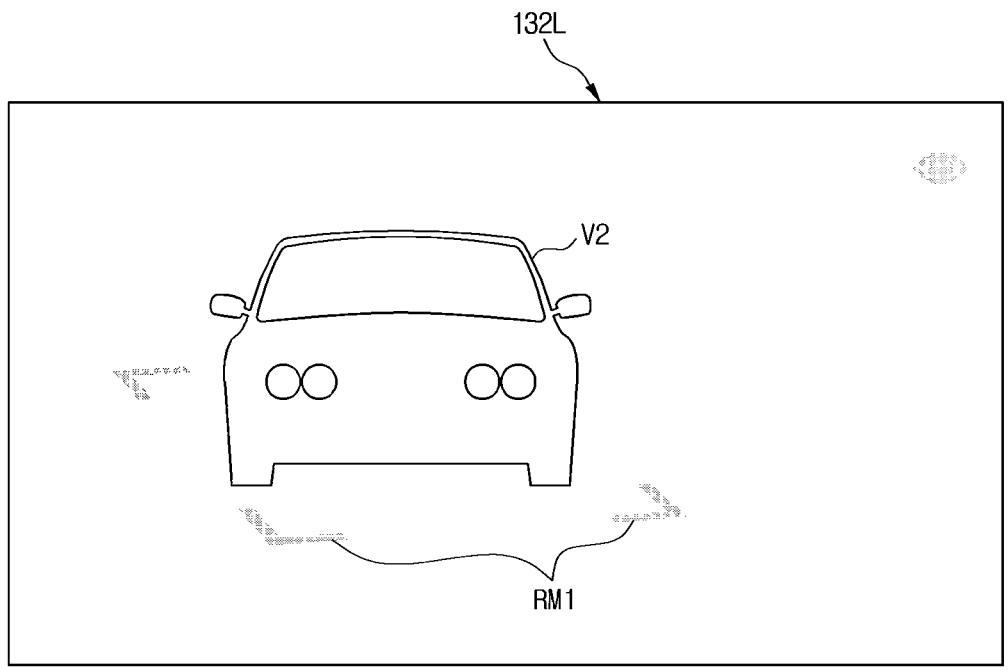
FIG. 19 and FIG. 20 illustrate examples of screens displayed on a side display.
Figure 20:
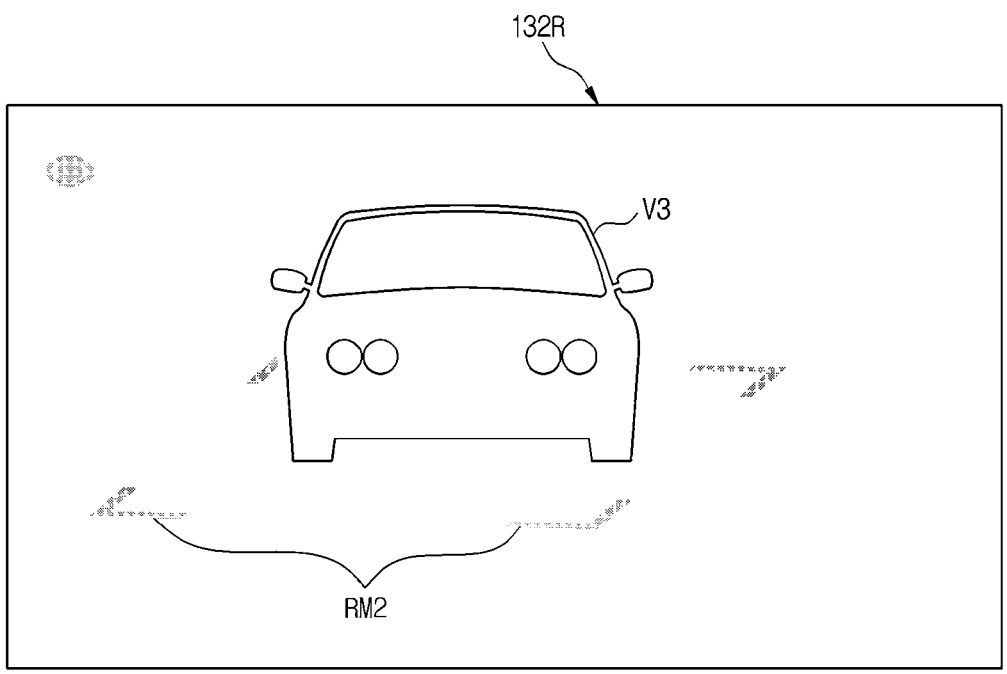

FIG. 18 is a flowchart for explaining a method of controlling a vehicle according to another exemplary embodiment of the present disclosure. FIG. 19 and FIG. 20 illustrate examples of screens displayed on a side display.

Referring to FIG. 18, the controller 200 may control the one or more side cameras 131L and 131R to obtain a rear lateral image of the vehicle 1 (1801). The controller 200 may control the one or more side displays 132L and 132R to output the rear lateral image of the vehicle 1 (1802).

For example, as illustrated in FIG. 19, a rear left image obtained by the first side camera 131L may be output through the first side display 132L. Also, as illustrated in FIG. 20, a rear right image obtained by the second side camera 131R may be output through the second side display 132R.

The first side display 132L may synthesize and display a graphic element RM1 indicating other vehicle V2 in the rear left image. The graphic element RM1 may be displayed as an augmented reality image. That is, the graphic element RM1 may overlap at a position of the other vehicle V2 in the photographed rear left image, and the graphic element RM1 may appear to exist in a real environment.

The second side display 132R may synthesize and display a graphic element RM2 indicating other vehicle V3 in the rear right image. The graphic element RM2 may be displayed as an augmented reality image. That is, the graphic element RM2 may overlap at a position of the other vehicle V3 in the photographed rear right image, and the graphic element RM2 may appear to exist in the real environment.

The controller 200 may identify the gaze direction of the driver based on a driver image obtained by the driver sensor 140 (1803). The controller 200 may adjust brightness of the transparent display 150 and brightness of the side displays 132L and 132R based on a gaze direction of the driver (1804).

The controller 200 may decrease the brightness of the transparent display 150 and increase the brightness of the side displays 132L and 132R, based on the gaze direction of the driver toward the side displays 132L and 132R. The controller 200 may increase the brightness of the transparent display 150 and decrease the brightness of the side displays 132L and 132R, based on the gaze direction of the driver toward the transparent display 150.

For example, the driver needs to look at the first side display 132L or the second side display 132R to check the rear lateral of the vehicle 1. For example, the driver may look at the first side display 132L by turning the head of the driver to the left or moving the pupil of the driver to the left to check the rear left side of the vehicle 1. In the instant case, by increasing a screen brightness of the first side display 132L positioned in the gaze direction of the driver, the driver may look at the rear left side of the vehicle 1 more clearly.

It is impossible for the driver to look at the transparent display 150 positioned in the front and the second side display 132R positioned at the right side of the vehicle 1 while looking at the first side display 132L positioned at the left side of the vehicle 1. When the driver looks at the first side display 132L, it is not necessarily required to keep the performance of the transparent display 150 and the second side display 132R high. Therefore, when the driver looks at the first side display 132L, reducing the screen brightness of the transparent display 150 and the second side display 132R helps to reduce the power consumption of the battery.

Also, the controller 200 may adjust the brightness of the transparent display 150 and the side displays 132L and 132R based on at least one of rotation of the steering device (steering wheel) or blinking of the direction indicator lamps. When the driver intends to turn the vehicle 1 to the left, the driver turns on the left turn indicator lamp and turns the steering device (steering wheel) to the left. The driver looks at the first side display 132L when the vehicle 1 turns left. Accordingly, the controller 200 may increase the brightness of the first side display 132L and decrease the brightness of the transparent display 150 and the brightness of the second side display 132R.

As is apparent from the above, the disclosed vehicle and control method thereof can adjust a height and transparency of a transparent display which is provided on a dashboard and include a transparent LCD panel or a transparent OLED panel.

Furthermore, the disclosed vehicle and control method thereof can properly provide an augmented reality image through the transparent display provided in front of the driver and use the transparent display as an infotainment device. Therefore, driving safety and convenience of a driver may be improved.

Furthermore, the disclosed vehicle and control method thereof can reduce power consumption by controlling an operation of a side display forming a digital side mirror. The power consumption may be optimized by automatically adjusting brightness of the side display based on a gaze direction of the driver.

A non-transitory computer-readable recording medium includes any type of recording medium in which instructions readable by the computer are stored. For example, there may be a read only memory (ROM), a random access memory (RAM), a magnetic tape, a magnetic disk, a flash memory, an optical data storage device, and the like.

In various exemplary embodiments of the present disclosure, the control device may be implemented in a form of hardware or software, or may be implemented in a combination of hardware and software.

The scope of the present disclosure includes software or machine-executable commands (e.g., an operating system, an application, firmware, a program, etc.) for facilitating operations according to the methods of various embodiments to be executed on an apparatus or a computer, a non-transitory computer-readable medium including such software or commands stored thereon and executable on the apparatus or the computer.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A vehicle comprising:
 a driver sensor provided inside the vehicle to obtain a driver image;
 a side camera provided to obtain a rear lateral image of the vehicle;
 a side display provided to output the rear lateral image obtained by the side camera;
 a transparent display provided on a dashboard to face a front of a driver and provided to descend inside the dashboard or ascend above the dashboard;
 an input device configured to obtain a user input including a direction indicator lever;
 a steering wheel configured to control a moving direction of the vehicle;
 direction indicator lamps configured to blink by manipulation of the direction indicator level; and
 a controller configured to adjust an ascending height of the transparent display and to adjust transparency of the transparent display, according to a driving mode selected by the user input,
 wherein the controller is further configured to:
  identify a gaze direction of the driver based on the driver image,
  decrease brightness of the transparent display and increase brightness of the side display based on the identified gaze direction of the driver toward the side display, and
  increase the brightness of the transparent display and decrease the brightness of the side display based on the identified gaze direction of the driver toward the transparent display, and wherein the controller is further configured to:
  determine whether the vehicle is turning left or right based on at least one of rotation of the steering wheel or blinking of the direction indicator lamps;
  in response to determining that the vehicle is turning left or right, decrease brightness of the transparent display and increase brightness of the side display; and
  in response to determining that the vehicle is not turning left or right, increase the brightness of the transparent display and decrease the brightness of the side display.

2. The vehicle of claim 1,
wherein the driving mode includes a manual driving mode and an autonomous driving mode, and
wherein the controller is configured to adjust the ascending height of the transparent display to a predetermined first height based on the manual driving mode selected or adjust the ascending height of the transparent display to a second height higher than the first height based on the autonomous driving mode selected.

3. The vehicle of claim 1,
wherein the driving mode includes a manual driving mode and an autonomous driving mode, and
wherein the controller is configured to adjust the transparency of the transparent display to a predetermined first transparent value based on the manual driving mode selected or adjust the transparency of the transparent display to a second transparent value lower than the first transparent value based on the autonomous driving mode selected.

4. The vehicle of claim 1, wherein the controller is configured to determine driving information to be displayed on the transparent display according to the driving mode and adjust at least one of a number of graphic element, size of the graphic element, position of the graphic element, or shape of the graphic element related to the driving information.

5. The vehicle of claim 4,
wherein the driving mode includes an autonomous driving mode, and
wherein the graphic element includes a first graphic element and a second graphic element, and
wherein the controller is configured to:
  divide a screen area of the transparent display into a first region in which the driving information is displayed and a second region in which multimedia information by execution of a multimedia application is displayed, based on the execution of the multimedia application in the autonomous driving mode; and
  control the transparent display to display the first graphic element related to the driving information in the first region and to display the second graphic element related to the multimedia information in the second region.

6. The vehicle of claim 4,
wherein the driving mode includes an autonomous driving mode, and
wherein the controller is configured to control the transparent display to hide the driving information in accordance with execution of a multimedia application in the autonomous driving mode and to control the transparent display to provide the driving information in a pop-up form in response to a situation in which a display of the driving information is required.

7. The vehicle of claim 4, further including:
a camera provided to photograph a front of the vehicle and obtain front image data,
wherein the controller is configured to:
  identify a road, a lane and other vehicle from the front image data; and
  control the transparent display so that graphic elements related to the driving information are displayed at positions corresponding to the road, the lane, and the other vehicle.

8. The vehicle of claim 7,
wherein the controller is configured to:
  identify a pupil of the driver based on the driver image;
  identify a vanishing point of the road from the front image data; and
  control the transparent display so that the graphic elements are displayed on a line connecting the vanishing point of the road and the pupil of the driver.

9. The vehicle of claim 1, wherein the transparent display includes a transparent liquid crystal display (LCD) panel or a transparent organic light emitting diode (OLED) panel.

10. The vehicle of claim 1, further including
a lifting device provided below the dashboard to ascend or descend the transparent display.

11. A method for controlling a vehicle, the method comprising:
receiving, by a controller, a selection of a driving mode through an input device;
adjusting, by the controller, an ascending height of a transparent display provided to descend inside a dashboard or ascend above the dashboard based on selection of the driving mode;
adjusting, by the controller, transparency of the transparent display based on selection of the driving mode;
displaying, by the controller, driving information determined based on selection of the driving mode on the transparent display;
obtaining, by a driver sensor, a driver image;
outputting, by a side display, a rear lateral image obtained by a side camera;
identifying, by the controller, a gaze direction of a driver based on the driver image;
decreasing, by the controller, brightness of the transparent display and increasing brightness of the side display based on the identified gaze direction of the driver toward the side display;
increasing, by the controller, the brightness of the transparent display and decreasing the brightness of the side display based on the identified gaze direction of the driver toward the transparent display;
determining, by the controller, whether the vehicle is turning left or right based on at least one of rotation of a steering wheel or blinking of direction indicator lamps;
decreasing, by the controller, brightness of the transparent display and increasing brightness of the side display in response to determining that the vehicle is turning left or right and
increasing, by the controller, the brightness of the transparent display and decreasing the brightness of the side display in response to determining that the vehicle is not turning left or right.

12. The method of claim 11,
wherein the driving mode includes a manual driving mode and an autonomous driving mode, and
wherein the adjusting of the ascending height of the transparent display includes:

adjusting the ascending height of the transparent display to a predetermined first height based on the manual driving mode selected; or adjusting the ascending height of the transparent display to a second height higher than the first height based on the autonomous driving mode selected.

13. The method of claim 11,
wherein the driving mode includes a manual driving mode and an autonomous driving mode, and
wherein the adjusting of the transparency of the transparent display includes:
adjusting the transparency of the transparent display to a predetermined first transparent value based on the manual driving mode selected; and
adjusting the transparency of the transparent display to a second transparent value lower than the first transparent value based on the autonomous driving mode selected.

14. The method of claim 11, wherein the displaying of the driving information includes adjusting at least one of a number of graphic element, size of the graphic element, position of the graphic element, or shape of the graphic element related to the driving information based on the selection of the driving mode.

15. The method of claim 14,
wherein the driving mode includes an autonomous driving mode,
wherein the graphic element includes a first graphic element and a second graphic element, and
wherein the displaying of the driving information includes:
dividing a screen area of the transparent display into a first region in which the driving information is displayed and a second region in which multimedia information by execution of a multimedia application is displayed, based on the execution of the multimedia application in the autonomous driving mode; and
displaying the first graphic element related to the driving information in the first region and displaying the second graphic element related to the multimedia information in the second region.

16. The method of claim 14,
wherein the driving mode includes an autonomous driving mode, and
wherein the displaying of the driving information includes hiding the driving information in accordance with execution of a multimedia application in the autonomous driving mode and providing the driving information in a pop-up form in response to a situation in which a display of the driving information is required.

17. The method of claim 14, further including:
photographing a front of the vehicle and obtaining front image data; and
identifying, by the controller, a road, a lane and other vehicle from the front image data,
wherein the displaying of the driving information includes displaying the graphic element related to the driving information at positions corresponding to the road, the lane, and the other vehicle.

18. The method of claim 17, further including:
identifying, by the controller, a pupil of the driver based on the driver image; and
identifying, by the controller, a vanishing point of the road from the front image data,
wherein the displaying of the driving information includes displaying the graphic element on a line connecting the vanishing point of the road and the pupil of the driver.

* * * * *